United States Patent [19]

Furuta et al.

[11] Patent Number: 5,704,757
[45] Date of Patent: Jan. 6, 1998

[54] FOOD MATERIAL TRANSFER APPARATUS

[75] Inventors: Toshihisa Furuta, Mie; Kimimichi Kuboyama; Yoshinori Miyakoshi, both of Tokyo; Tatsuya Hirano, Mie, all of Japan

[73] Assignee: Fuji Electric Co., Ltd., Kawasaki, Japan

[21] Appl. No.: 723,542

[22] Filed: Sep. 30, 1996

[30] Foreign Application Priority Data

Oct. 5, 1995 [JP] Japan .................. 7-258471

[51] Int. Cl.$^6$ .................................. B65G 59/04
[52] U.S. Cl. .................. 414/797; 271/91; 271/106
[58] Field of Search .................. 414/797, 796.9, 414/796.5; 271/91, 106

[56] References Cited

U.S. PATENT DOCUMENTS

| | | | |
|---|---|---|---|
| 3,391,926 | 7/1968 | Jaatinen | 414/797 |
| 4,513,957 | 4/1985 | Schaefer, Jr. | 271/91 |
| 4,971,515 | 11/1990 | Pol et al. | 414/797 |
| 5,035,568 | 7/1991 | Joulin | 414/797 |
| 5,075,939 | 12/1991 | Michitoshi et al. | 271/106 |
| 5,127,645 | 7/1992 | Torisawa | 271/106 |
| 5,234,207 | 8/1993 | Lindstrom et al. | 271/106 |
| 5,622,362 | 4/1997 | Shiiki et al. | 271/91 |

FOREIGN PATENT DOCUMENTS

| | | | |
|---|---|---|---|
| 132236 | 10/1981 | Japan | 414/797 |
| 108620 | 6/1984 | Japan | 414/797 |
| 124626 | 7/1984 | Japan | 414/797 |
| 4032422 | 2/1992 | Japan | 414/797 |

*Primary Examiner*—Karen B. Merritt
*Assistant Examiner*—Douglas Hess
*Attorney, Agent, or Firm*—Kanesaka & Takeuchi

[57] ABSTRACT

A food material transfer apparatus of the invention transfers flexible stacked food materials one by one to a predetermined position. The transfer apparatus is formed of a plurality of vacuum sucking pads for picking up one food material from the stacked food materials, a pad-lowering device connected to the vacuum sucking pads for lowering the same, a suction detection device communicating with the vacuum holding pads for detecting if at least one of the pads sucks the one food material, and a control section connected to the pad-lowering device and the suction detection device. When the suction detection device detects that the pads suck the one food material, the control section operates the pad-lowering device to further lower the pads for a predetermined amount to thereby securely hold the one food material by the plurality of the vacuum sucking pads.

6 Claims, 7 Drawing Sheets

PRIOR ART

FOOD MATERIAL TRANSFER APPARATUS

BACKGROUND OF THE INVENTION AND RELATED ART STATEMENT

The present invention relates to a food material transfer apparatus using a vacuum sucking hand to transfer flexible food materials, such as tacos.

Figure 4:
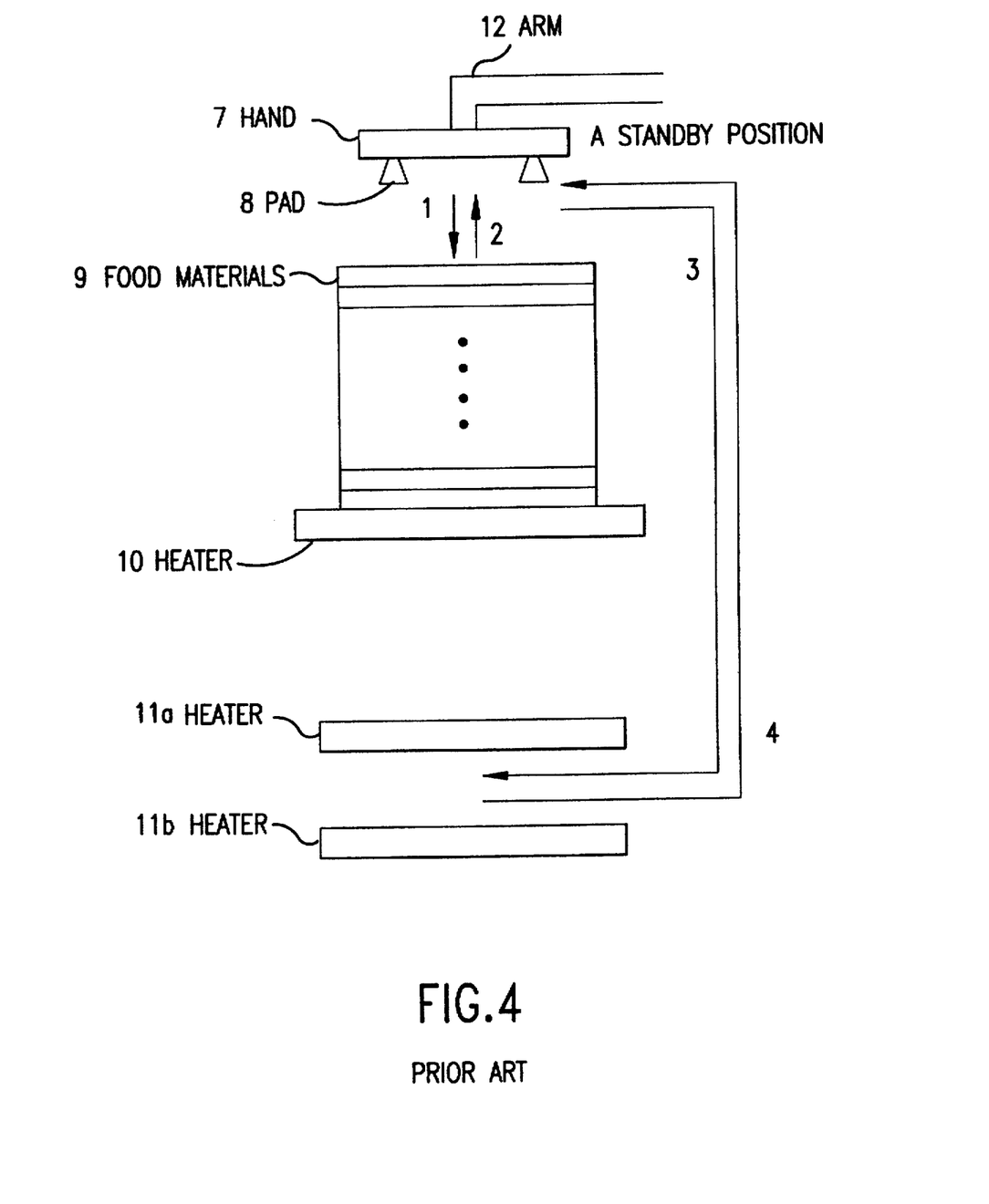
FIG. 4 shows an explanatory view showing an outline of a food material transfer operation.

An operation of a conventional food material transfer apparatus, which handles tacos as an example, is explained in brief with reference to FIG. 4.

Flexible disc-like food materials 9 are stacked and placed on a tray 10. Upon receiving a sales instruction, a hand 7 which has been located in a standby position A and has pads 8 with a vacuum sucking mechanism, is lowered by a movement of an arm 12, as shown by an arrow 1 to pick up one of the food materials 9. When the pads 8 pick up one of the food materials 9, the hand 7 is raised, as shown by an arrow 2 and is moved through a passage shown by an arrow 3 to transfer the food material 9 between heaters 11a and 11b. After setting the food material 9 between the heaters 11a, 11b, the hand 7 is moved through a passage shown by an arrow 4 to return to the position A. In the above series of operations, the food materials are transferred one by one from the tray 10 to the heaters 11a and 11b.

Whether the pads 8 suck or hold the food material 9 is determined by a vacuum sensor (not shown) in the vacuum sucking mechanism. The hand has multiple sets of the pads 8, and normally is lowered until all the pads have been detected to become a vacuum condition.

Conventional food material transfer apparatuses have the following problems.

In these apparatuses, the food materials are stacked, but the height of the surface of the uppermost food material may vary, i.e. incline, if the food materials are flexible, like tacos. The degree of the variation depends on the height of the piled-up food materials, and increases as a number of piled-up food materials increases, resulting in a greater inclination of the materials.

As a result, in the above sucking or holding control, the pads may be lowered down to the lowest surface of the inclined food materials and press them to possibly make holes therein, or the repulsive force of the materials may break the arm mechanism.

To cope with this problem, the sensitivity of the vacuum sensor is adjusted so that an appropriate amount of pressure is applied when the pads make contact with the food material. Since, however, the surface of the food material has fine convexes and recesses and also is different in condition, respectively, the pads do not always make contact with the food materials under the same contact conditions, i.e. clearance. Consequently, the amount of pressure to be applied when the vacuum sensor is being activated varies. If the pressure is small, the pads can not pick up the food material, whereas if the pressure is large, the pads may make holes in the food material or the arm mechanism may be broken.

In other words, the above inconvenience occurs because the effects of the height of the piled-up food materials are not taken into consideration in controlling the amount of movement of the pads when the pads pick up the top food material or the pads pick up a lower food material.

An object of the invention is to control an apparatus that uses pads with a vacuum sucking or holding mechanism to transfer food materials, so as to provide an appropriate amount of downward movement of the pads according to the height of the piled-up food materials, in order to prevent the pads from damaging the food materials or the transfer mechanism.

SUMMARY OF THE INVENTION

According to a first aspect of the invention, a food material transfer apparatus uses multiple vacuum sucking pads to pick up flexible stacked food materials and then to move them to a predetermined position. The food material transfer apparatus comprises sucking or holding detection means for detecting that the pads suck or hold a food material; pad lowering means for lowering the pads; and a control section for instructing the pad lowering means to further lower the pads for a specified amount when the sucking detection means detects that a set of pads is holding or sucking a food material.

In the above apparatus, the pads are lowered downwardly for a predetermined amount after a set of pads sucks a food material. Thus, the food materials and the transfer mechanism are not damaged.

According to a second aspect of the invention, a food material transfer apparatus uses multiple vacuum sucking or holding pads to pick up flexible stacked food materials and then to move them to a predetermined position. The food material transfer apparatus comprises sucking or holding detection means for detecting that the pads suck or hold a food material; pad lowering means for lowering the pads; calculation means for calculating the maximum height of the piled-up food materials and the amount of a downward movement from the maximum height position of the piled-up food materials, i.e. its top surface, corresponding to the maximum height; and a control section for instructing the pad lowing means to lower the pads for the amount of the downward movement calculated by the calculation means when the sucking detection means detects that a set of pads is holding a food material.

In accordance with a food material transfer apparatus according to a third aspect, the maximum height of the piled-up food materials is defined by deleting a calculated value from the height extending from the surface of a tray on which the food materials are stacked to the standby position of the pads. The calculated value is determined from operational data obtained by the pad lowering means which indicates the amount of the downward movement of the pads until the sucking detection means detects that a set of the pads sucks or holds the food material.

In a food material transfer apparatus according to a fourth aspect, the food material transfer apparatus is formed according to the third aspect, wherein the amount of the downward movement obtained by the calculation means is a value calculated on the basis of the number and the height of the piled-up food materials.

In the above apparatus, after a set of the pads sucks or notices the food material, the pads are further lowered for an amount corresponding or relative to the height of the piled-up food materials. Thus, the pads stop at a position suitable for holding the food materials without damaging the food materials or the transfer mechanism.

DETAILED DESCRIPTION OF PREFERRED EMBODIMENTS

Figure 1:
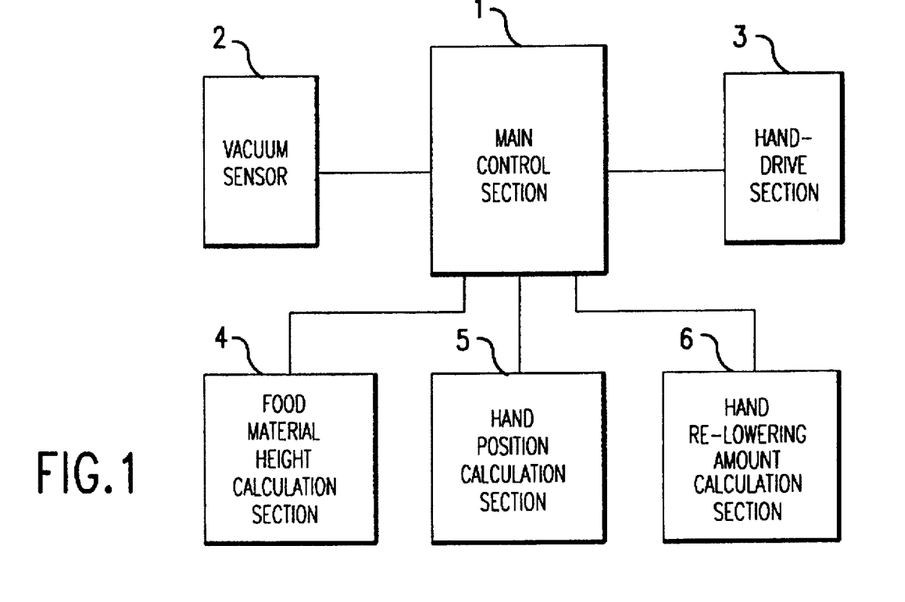
FIG. 1 is a block diagram showing a structure of one embodiment of the invention.
Figure 5:
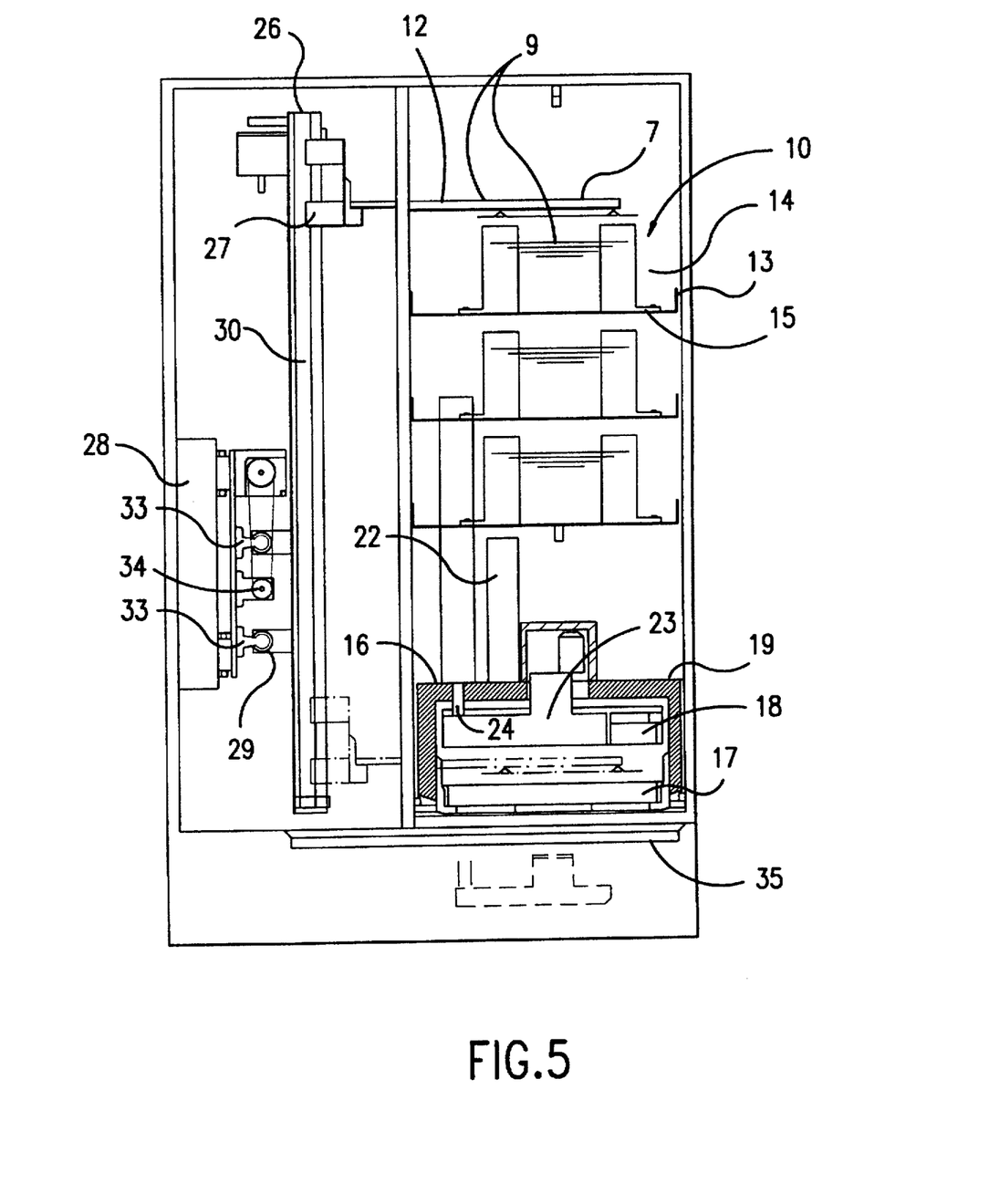
FIG. 5. is a front view of an overall food material transfer apparatus.
Figure 6:
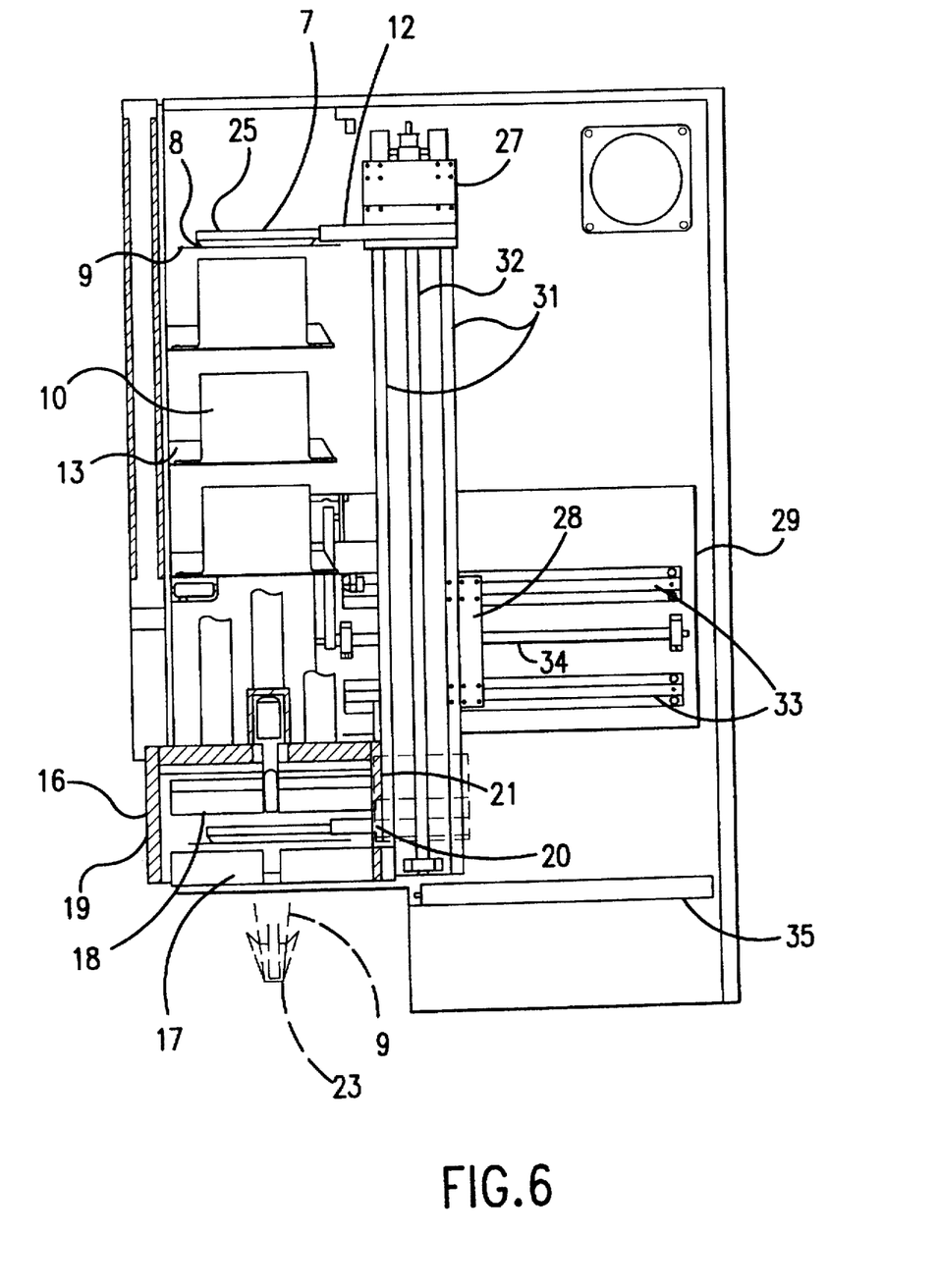
FIG. 6 is a side view of the overall food material transfer apparatus.

FIG. 1 is a block diagram showing a structure of one embodiment of the invention. FIG. 5 is a front view, and FIG. 6 is a side view of the overall apparatus. The embodiment is a food material transfer apparatus used in preparing tacos.

(1) Outline of the Overall Apparatus

Figure 7:
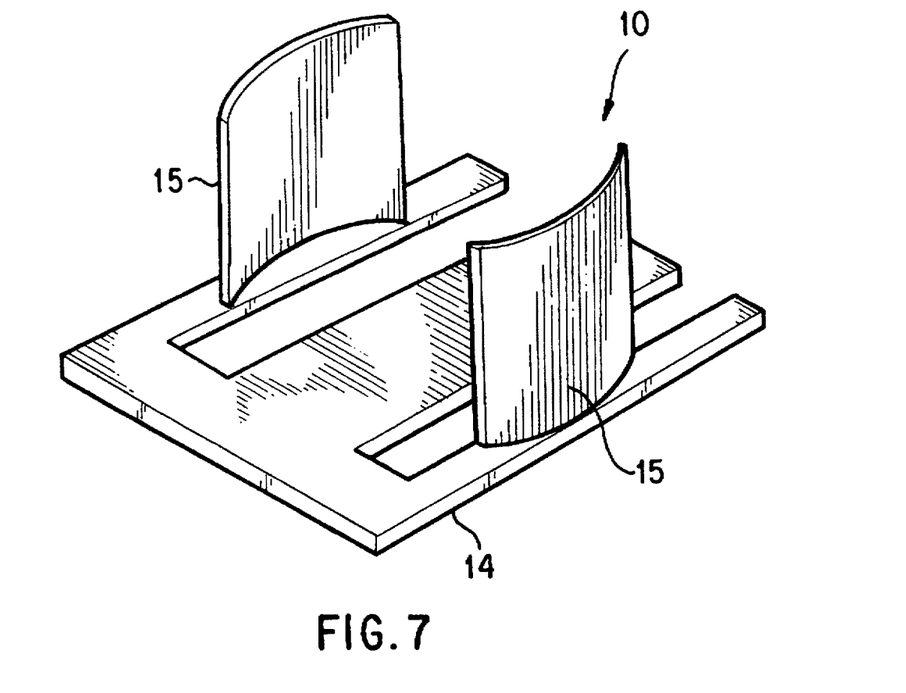
FIG. 7 is a perspective view of a tray section.

As shown in FIGS. 5 and 6, the food material transfer apparatus has three vertically arranged shelf frames 13. Each shelf frame 13 has a tray 10 screwed thereto. The tray 10 comprises a base plate 14 and arcuate-shaped side walls 15 disposed thereon to face opposite to each other (see FIG. 7).

A heating device 16 is installed below the trays 10. The heating device 16 comprises a lower heating plate 17, an upper heating plate 18, an adiabatic or heat insulating case 19 covering the overall device, and an adiabatic or heat insulating door 21 that opens and closes an insertion opening 20. The adiabatic door 21 is integrally formed with the upper heating plate 18, and is moved upward and downward together with the upper heating plate 18 when an elevating shaft 22 mounted on an elevating device (not shown) moves upward and downward.

An extruding or pushing device 23 for extruding a heated food material 9 downward is a tie plate member that stands upright with its longitudinal axis oriented horizontally, and moves upward and downward when an extruding shaft 24 mounted on an elevating device (not shown) is moved upwardly and downwardly. The elevating device on which the extruding shaft 24 is mounted is different from the one described above, i.e. the elevating device on which an elevating shaft 22 is mounted.

The food materials 9 disposed on the tray 10 are transferred to the heating device 16 as follows. A vacuum sucking or holding hand 7 shown in FIG. 6 has multiple pads 8 on the bottom surfaces of beams 25 disposed at one end of an arm 12 (FIG. 8), and the pads 8 hold and pick up the food materials 9 one by one.

Figure 8:
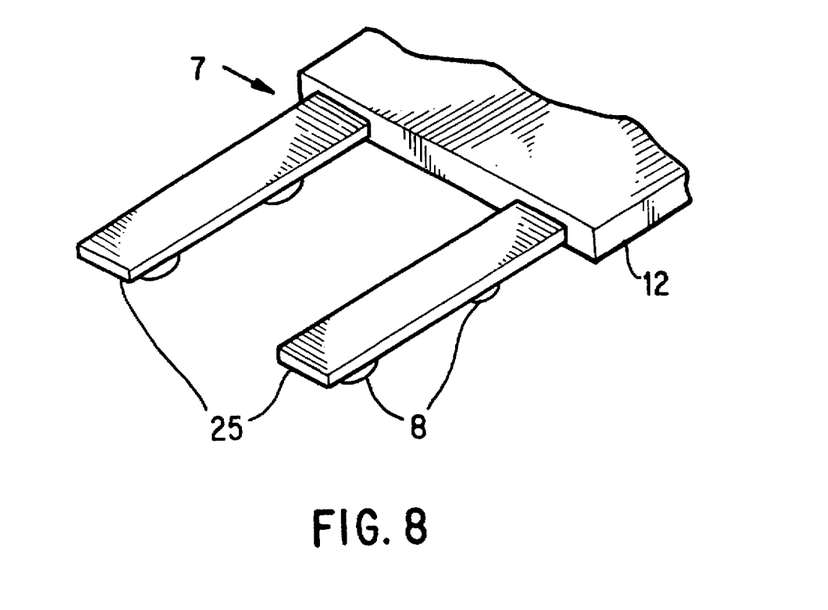
FIG. 8 is a perspective view of a hand section.

In case the pads 8 hold the food material 9, when all the sets of the pads 8 detect a predetermined vacuum state, the apparatus determines that the pads 8 hold the food material to initiate the transfer of the food material. In addition, the sensitivity of the vacuum sensor for each pad 8 is adjusted so as to provide an appropriate amount of pressing movement of the pads to the food material when the pads are pressed against the food material.

The arm 12, holding the food material 9, transfers the food material 9 through the insertion opening 20 to the inside of the heating device 16 using a bi-directional straight advance mechanism 26 that can move vertically and laterally.

The bi-directional straight advance mechanism 26 comprises a vertically movable table 27 and a lateral portion 29 for moving a lateral table 28 horizontally. A vertical portion 30 comprises a pair of guide shafts 31 for guiding the table 27 so that the table 27 advances linearly and vertically, a ball screw 32 for driving the table 27 vertically, and a frame. The lateral portion 29 comprises a pair of guide shafts 33 for guiding the lateral table 28 so that the table 28 advances linearly and horizontally, a ball screw 34 for driving the lateral table 28 laterally, and a frame. The arm 12 is detachably fixed to the table 27, and the vertical portion 30 is, as a whole, fixed to the lateral table 28.

With the above structure, the food materials 9 held on the three trays are picked up by the vacuum sucking hand 7 one by one, and inserted and set into the heating device 16, where they are heated. After the food material is heated in the heating device 16, the food material 9 is transferred to the outside while being extruded or pushed downwardly by the extruding device 23. Reference numeral 35 designates a pan for receiving the food material 9 when it inadvertently falls from the hand 7.

(2) Operation of the Invention

In FIG. 1, numeral 1 is a main control section for controlling the overall apparatus, to which the following equipments are connected. Reference numeral 2 denotes a vacuum sensor that detects whether or not the pads suck or hold a food material. The vacuum sensor detects a condition for each set formed of two pads in the four pads in total. Reference numeral 3 indicates a hand-drive section that drives the hand with the pads mounted thereon, which can activate a pulse motor to detect the moving distance of the pads by the number of drive pulses of the pulse motor. Reference numeral 4 designates a food material height calculation section; numeral 5 is a hand position calculation section; and numeral 6 is a hand re-lowering amount calculation section described below.

Figure 2A:
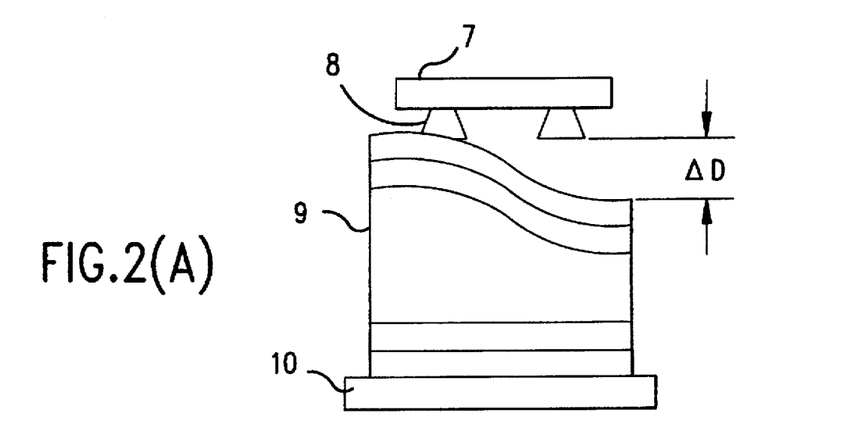
FIG. 2(a) is an explanatory side view showing a state in which a large amount of food materials is piled on a tray.
Figure 2B:
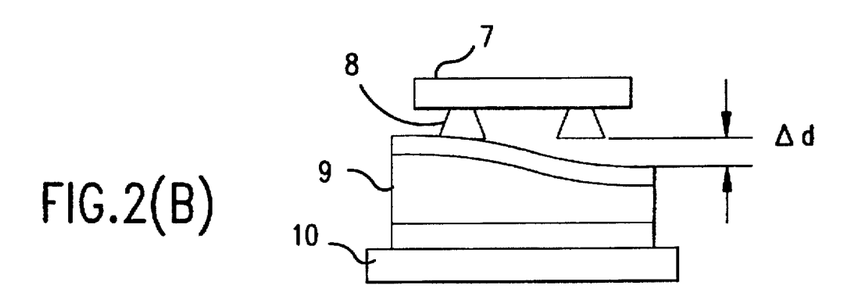
FIG. 2(b) is an explanatory side view showing a state in which a small amount of food materials is piled on a tray.

FIG. 2(a) shows a state in which a large amount of the food materials 9 is stacked on the tray 10, and FIG. 2(b) show a state in which a small amount of the food materials 9 is stacked on the tray 10. In these figures, the surface of the top food materials 9 is not horizontal but is inclined as shown by $\Delta D$ and $\Delta d$. Thus, the pads 8 are lowered from above to, at first, hold or suck the highest surface portion of the top food material, and are further lowered to suck a lower surface portion of the top food material.

Figure 3:
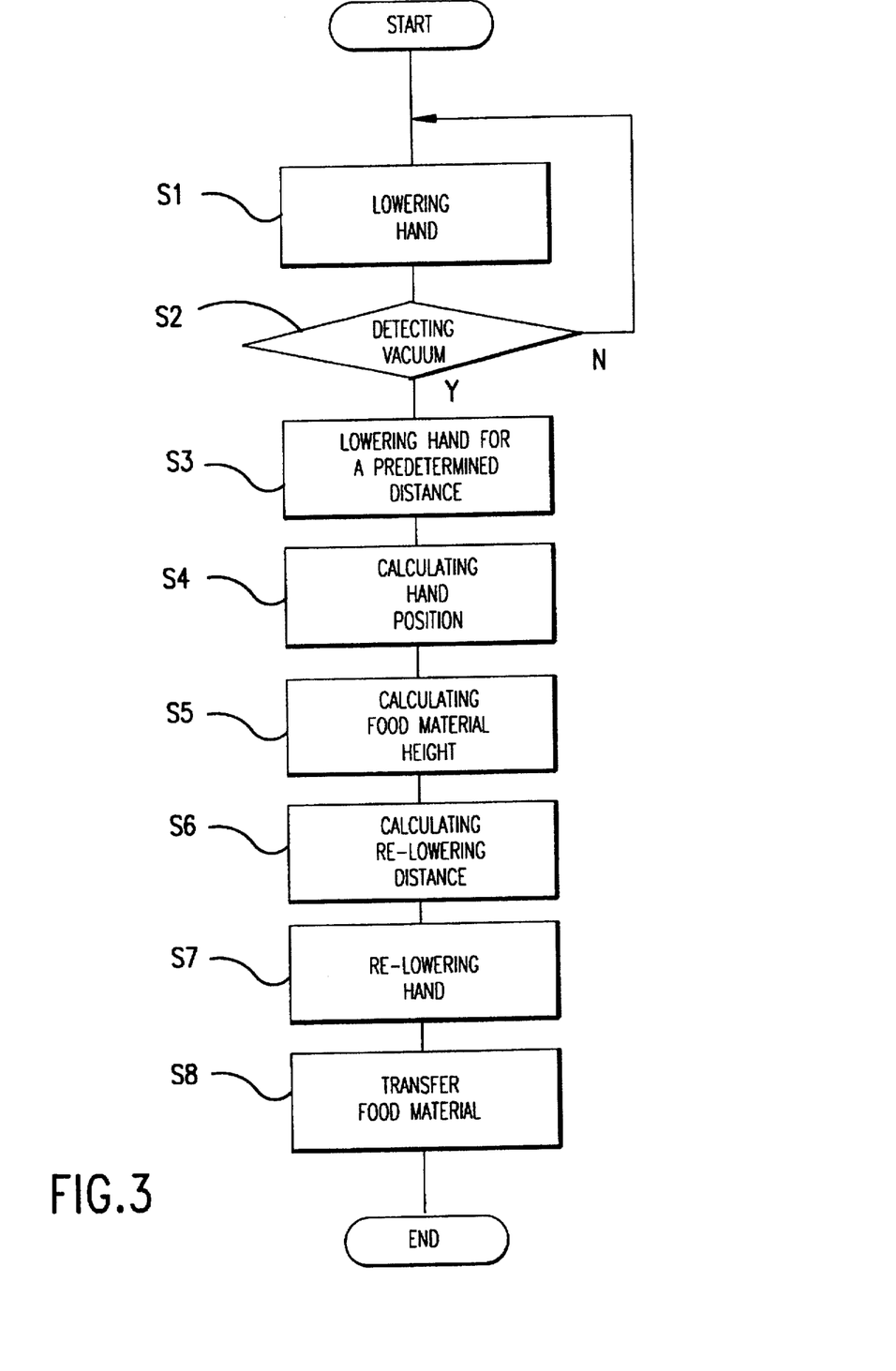
FIG. 3 is a flowchart showing an operation based on the invention shown in FIG. 1.

FIG. 3 is a flowchart showing the integral operation of the invention. The operation is described with reference to FIGS. 1, 2(a) and 9.

When a sales instruction is issued, the hand 7 is lowered while being subjected to suction, in order to transfer a food material 9 from the tray 10 to a heater (FIG. 4) (step S1).

The sensitivity of the vacuum sensors 2 for the pads 8 has been improved so that the sensors can be activated by only slight contact of the pads 8 with the food material 9. In this detection process, it is determined whether or not either of the pads 8 has made contact with the food material to activate the corresponding vacuum sensor 2 (step S2); and if not (branch N), this detection process returns to step S1 wherein the hand 7 continues to move downward until the pads 8 make contact with the food material. Once the vacuum sensor 2 has been activated (branch Y), that is, the hand 7 is positioned at the highest portion of the food material 9, the process proceeds to step S3.

At step 3, the hand 7 is further lowered for a predetermined amount or distance h2. By selecting an appropriate amount, the hand can be moved to a position at which the other set of the pads 2 can hold the food material 9. The amount of the downward movement can be controlled through the number of drive pulses for the step motor (not shown) for moving the hand 7.

The hand position calculation section 5 calculates the amount of the downward movement or the position of the hand 7 where the vacuum sensor 2 has been activated at step S2, that is the amount or distance of the downward movement h1 from the hand's standby position to the position in step 2 (step S4). The amount of the downward movement of the hand 7 can be calculated through the number of the drive pulses of the step motor for moving the hand 7, as described above.

Figure 9:
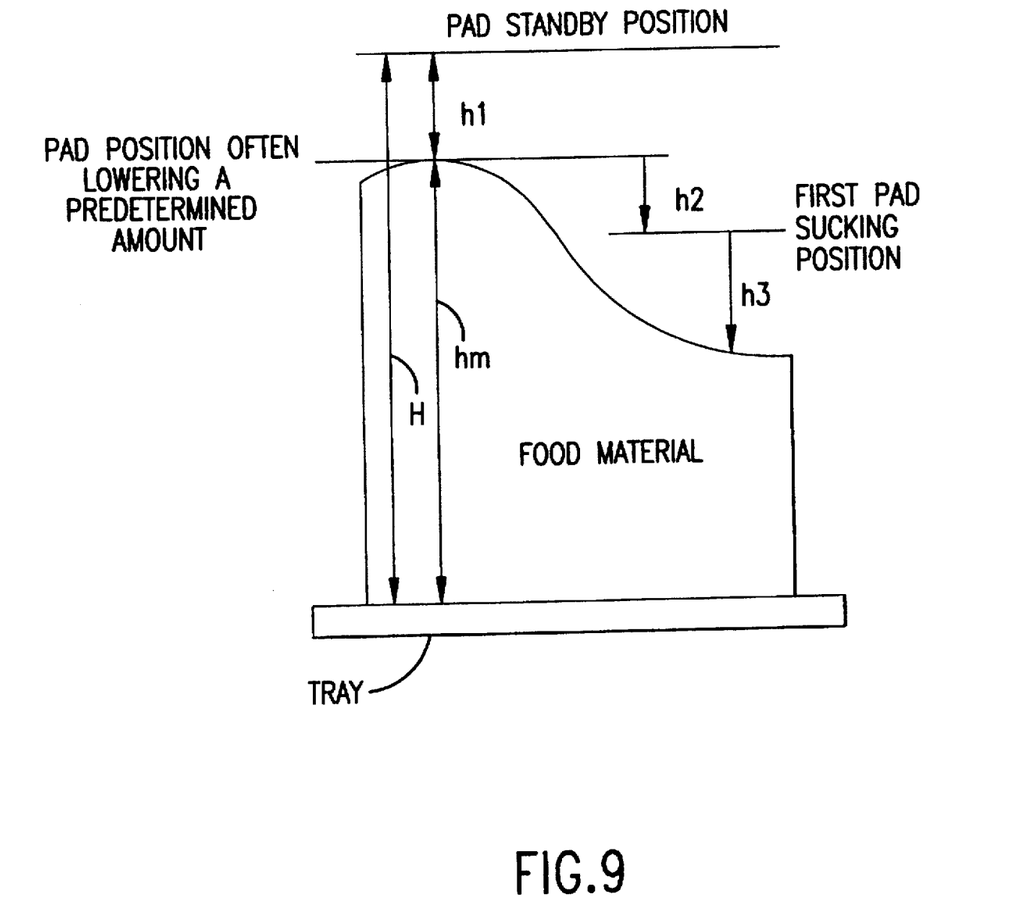
FIG. 9 is an explanatory view showing a relationship between the height of the piled-up food materials and downward movements of the hand.

Furthermore, by using the above data, the food material height calculation section 4 calculates the height hm from the tray 10 up to the top food materials, i.e. the amount of the food material (step S5). If the height from the tray 10 up to the steady standby position of the hand 7 is assumed to be H, then hm=H−h1. This relationship is shown in FIG. 9.

Next, based on the amount or height of the food materials hm, the hand re-lowering amount calculation section 6 calculates the re-lowering amount or distance h3 of the hand 7 (step 6) to re-lower the hand 7 (step 7). That is, ΔD shown in FIG. 2(a) tends to increase as the height of the piled-up food materials increases. Thus, for example, the relationship between ΔD and the height of the piled-up materials corresponding to the height of the food materials hm calculated in step S5, or between ΔD and the number of the food materials, is determined beforehand and then stored in the hand re-lowering amount calculation section 6. The re-lowering amount h3 is determined by subtracting the amount of the downward movement h2 in step S3 from ΔD calculated on the basis of the stored relationship.

Once all the pads suck the food material, the material is transferred (step 8) to finish the process.

If, at step S3, the second set of the pads sucks or holds the food material as a result of the lowering of the pads 8 for the specified amount or distance of the downward movement h2, the re-lowering lowering amount calculated in step S6 is zero, and the hand 7 is not moved at step S7. The process then proceeds to step S8 to end.

These operations enable the food materials to be transferred without being damaged by the hand.

According to the invention, after a set of pads sucks or holds a food material, the pads are lowered for a predetermined amount or distance, thereby enabling the food material to be transferred without damaging the material or the apparatus.

In addition, after a set of pads holds the food material, the food material can be reliably transferred without causing damage to the food material or the apparatus by calculating the amount of the downward movement of the pads according to the height of the piled-up food materials.

What is claimed is:

1. A food material transfer apparatus for transferring flexible stacked food materials one by one to a predetermined position, comprising:

a plurality of vacuum sucking pads for picking up one food material from the stacked food materials, pad-lowering means connected to the vacuum sucking pads for lowering the same, suction detection means communicating with the vacuum sucking pads, said suction detection means detecting if at least one of the pads sucks the one food material, calculation means electrically connected to the suction detection means, said calculation means calculating a height of the stacked food materials and a distance of a downward movement of the pads from a position corresponding to the height of the stacked food materials, and a control section connected to the pad-lowering means and the suction detection means, said control section, when the suction detection means detects that at least one of the pads sucks the one food material, operating the pad-lowering means to further lower the pads for said distance of the downward movement to thereby securely hold the one food material by the plurality of the vacuum sucking pads.

2. A food material transfer apparatus according to claim 1, wherein the stacked food materials are placed on a tray, and the vacuum sucking pads are located in a standby position before one of the stacked food materials is transferred, the height of the stacked food materials being determined by the calculation means such that a distance of a measured downward movement of the pads from the standby position to a position that the suction detection means detects the one food material is deleted from a length extending from a surface of the tray to the standby position of the pads.

3. A food material transfer apparatus according to claim 2, wherein the distance of the downward movement is calculated from operational data obtained by the pad-lowering means.

4. A food material transfer apparatus according to claim 3, wherein the distance of the downward movement is a value calculated on a basis of a number and the height of the stacked food materials.

5. A food material transfer apparatus according to claim 1, wherein said suction detection means outputs a detection signal to the control section when at least one of the pads contacts the one food material.

6. A food material transfer apparatus according to claim 1, wherein the distance of the downward movement of the pads from the position corresponding to the height of the stacked food materials includes a first predetermined distance and a second distance corresponding to the height of the stacked food materials, said pad-lowering means being operated for the first predetermined distance and then for the second distance.

* * * * *

UNITED STATES PATENT AND TRADEMARK OFFICE
CERTIFICATE OF CORRECTION

PATENT NO. : 5,704,757
DATED : January 6, 1998
INVENTOR(S) : Toshihisa Furuta, Kimimasa Kuboyama, Yoshinori Miyakoshi, Tatsuya Hirano It is certified that error appears in the above-indentified patent and that said Letters Patent is hereby corrected as shown below:

On the title page: Item [75]

INVENTORS section, line 1, change "Kimimichi" to --Kimimasa--;
ABSTRACT section, line 8, change "holding" to --sucking--;

In column 4, line 39, change "show" to --shows--;

In column 5, line 17, change "material" to --materials--; and line 40, delete "lowering".

Signed and Sealed this

Twenty-sixth Day of May, 1998

Attest:

BRUCE LEHMAN

Attesting Officer

Commissioner of Patents and Trademarks